(12) United States Patent
Li et al.

(10) Patent No.: US 7,907,688 B2
(45) Date of Patent: Mar. 15, 2011

(54) OPEN LOOP MIMO RECEIVER AND METHOD USING HARD DECISION FEEDBACK

(75) Inventors: Qinghua Li, Sunnyvale, CA (US); Xintian E. Lin, Mountain View, CA (US)

(73) Assignee: Intel Corporation, Santa Clara, CA (US)

(*) Notice: Subject to any disclaimer, the term of this patent is extended or adjusted under 35 U.S.C. 154(b) by 1349 days.

(21) Appl. No.: 11/141,297

(22) Filed: May 31, 2005

(65) Prior Publication Data

US 2006/0269022 A1 Nov. 30, 2006

(51) Int. Cl.
*H04B 7/10* (2006.01)

(52) U.S. Cl. ......... 375/347; 375/346; 375/349; 375/267; 375/341; 375/260; 375/325; 375/350; 375/343; 375/262; 375/285; 714/795; 714/810; 714/750; 714/780; 714/786

(58) Field of Classification Search ............... 375/346, 375/347, 349, 267, 341, 148, 262, 260, 261, 375/340, 325, 350, 343, 285, 144, 150, 152; 455/63.1, 278.1, 290, 343.6; 714/795, 810, 714/750, 780, 786; 708/303, 819

See application file for complete search history.

(56) References Cited

U.S. PATENT DOCUMENTS

| | | | | |
|---|---|---|---|---|
| 6,956,893 B2* | 10/2005 | Frank et al. | | 375/147 |
| 2003/0076797 A1* | 4/2003 | Lozano | | 370/334 |
| 2004/0001564 A1* | 1/2004 | Chan et al. | | 375/341 |
| 2006/0121946 A1* | 6/2006 | Walton et al. | | 455/561 |

OTHER PUBLICATIONS

Alexander, Paul D., et al., "Iterative Detection in Code-Division Multiple-Access with Error Control Coding", *Europ. Trans. Telcommun.*, vol. 9, (1998),419-425.

Giallorenzi, Thomas R., et al., "Suboptimum Multiuser Receivers for Convolutionally Coded Asynchronous DS-CDMA Systems", *IEEE Transactions on Communications*, vol. 44, (Sep. 1996),1183-1196.

Li, Qinghua, et al., "Turbo Multiuser Detection for Turbo-Coded CDMA in Multipath Fading Channels", *IEEE Transactions on Vehicular Technology*, vol. 51, (Sep. 2002),1096-1108.

Moher, Michael, "An Iterative Multiuser Decoder for Near-Capacity Communications", *IEEE Transactions on Communications*, vol. 46, (Jul. 1998),870-880.

* cited by examiner

*Primary Examiner* — David C Payne
*Assistant Examiner* — Rahel Guarino
(74) *Attorney, Agent, or Firm* — Thorpe North & Western LLP

(57) ABSTRACT

A receiver for use in performing open loop MIMO performs parallel interference cancellation to reduce interference caused by other spatial streams. Residual interference within an interference-cancelled signal is mitigated using MMSE filtering. The receiver processes received signals in multiple iterations. On each successive iteration, an MMSE filter assumes a lower interference power level than a previous iteration.

29 Claims, 3 Drawing Sheets

OPEN LOOP MIMO RECEIVER AND METHOD USING HARD DECISION FEEDBACK

TECHNICAL FIELD

The invention relates generally to receiver techniques for use in wireless/wired receivers and, more particularly, to techniques for use in multiple-input, multiple-output (MIMO) based receivers.

BACKGROUND OF THE INVENTION

Multiple input, multiple output (MIMO) is a radio communication technique in which both a transmitter and a receiver use multiple antennas to wirelessly communicate with one another. By using multiple antennas at the transmitter and receiver, the spatial dimension may be taken advantage of in a manner that may improve the overall performance of the wireless link. MIMO may be practiced as either an open loop or a closed loop technique. In closed loop MIMO, channel-related information is used within a transmitting device to allow the transmitting device to precondition transmit signals, before they are transmitted, to better match the present channel state. In open loop MIMO, on the other hand, a transmitting device has no specific knowledge of the condition of the channel before signals are transmitted to a receiving device. Open loop MIMO is generally simpler to implement and uses less overhead than closed loop MIMO. However, open loop MIMO suffers from interference between the various spatial streams in the MIMO channel. There is a general need for efficient and accurate techniques for processing received signals in an open loop MIMO system.

DETAILED DESCRIPTION

Figure 1:
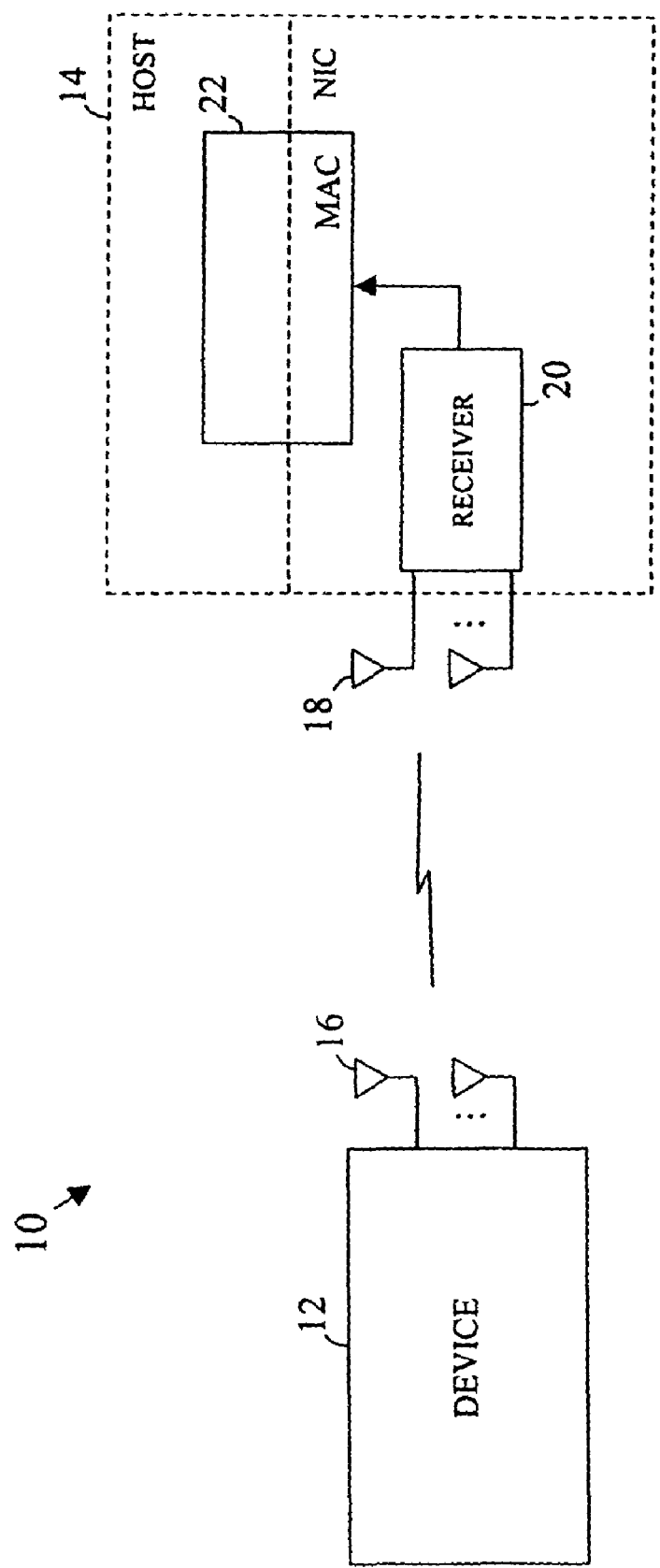
FIG. 1 is a block diagram illustrating an example wireless network arrangement that may incorporate features of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example wireless network arrangement 10 that may incorporate features of the present invention. As illustrated, a first wireless device 12 is communicating with a second wireless device 14 through a wireless communication link. The first and second wireless devices 12, 14 may include, for example, (a) a wireless access point (AP) and a wireless client device acting in an infrastructure mode of operation, (b) two wireless client devices acting in an ad hoc mode of operation, (c) two wireless APs communicating with one another, or (d) some other network arrangement. As shown, the first wireless device 12 has multiple antennas 16 for use in transmitting signals into and/or receiving signals from the wireless channel. The first wireless device 12 may include any number (greater than one) of antennas 16. Likewise, the second wireless device 14 includes multiple antennas 18 (any number greater than one) for use in transmitting signals into and/or receiving signals from the wireless channel. Any type of antennas may be used including, for example, one or more dipole antennas, one or more patch antennas, one or more helical antennas, and/or others. The wireless network arrangement 10 may be used to carry out multiple input, multiple output (MIMO) communications between the first and second devices 12, 14. In a MIMO based system, data may be transmitted from a transmitting device to a receiving device within multiple spatial streams. Each spatial stream will typically carry different data from the other spatial stream(s). By transmitting different data within each of the spatial streams, the overall throughput of the link may be increased significantly. In some embodiments, however, the same data is transmitted within each of the multiple spatial streams.

As shown in FIG. 1, the second wireless device 14 may include, among other things, a receiver 20 coupled to the multiple antennas 18 for use in processing signals received by the multiple antennas 18. Although not shown, the receiver 20 may include a radio frequency (RF) portion to process the RF receive signals and convert them to a baseband representation and a baseband processing portion to further process the baseband information. The output of the receiver 20 may be delivered to, for example, a medium access control (MAC) processing subsystem 22 for further processing. Transmitter functionality may also be provided within the second wireless device 14. If provided, the transmitter functionality may use the same antennas 18 as the receiver 20 (with, for example, a duplexer or other structure to permit antenna sharing) or different "transmit" antennas may be provided. In the illustrated embodiment, the receiver 20 and a lower portion of the MAC processing subsystem 22 (the lower MAC) are located within a wireless network interface card (NIC) and an upper portion of the MAC processing subsystem 22 is located within a host device that is carrying the wireless NIC. The wireless NIC may be removably inserted into a port (e.g., a peripheral component interconnect (PCI) slot, a PC card slot, etc.) of the host device or it may be an integral part of the host device. The host device may include, for example, a computer unit (e.g., a desktop, laptop, palmtop, tablet, etc. computer), a personal digital assistant (PDA), a cellular telephone, or some other device. Other arrangements within the second wireless device 14 may alternatively be used.

Figure 2:
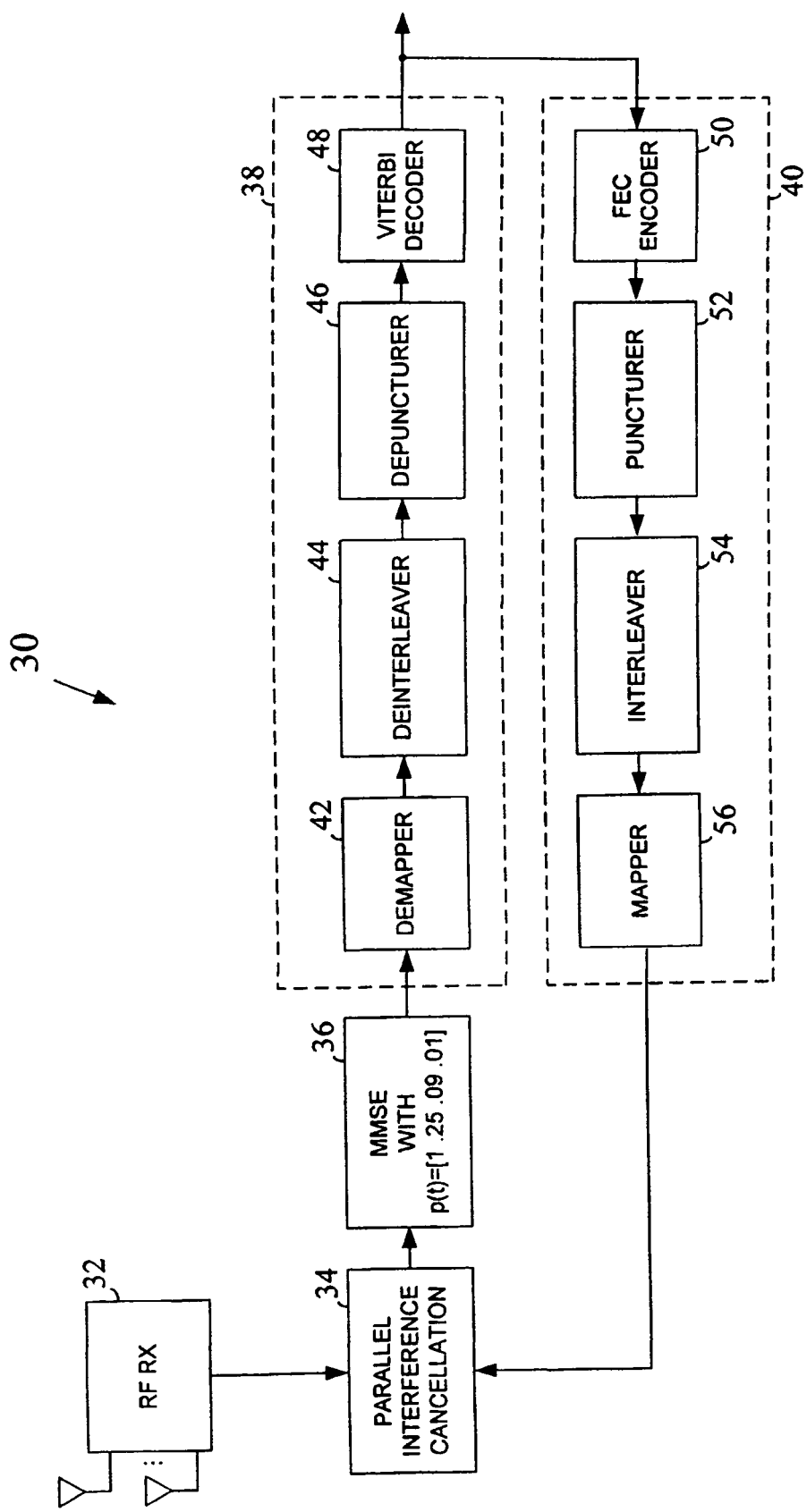
FIG. 2 is a block diagram illustrating an example iterative receiver arrangement in accordance with an embodiment of the present invention.

FIG. 2 is a block diagram illustrating an example receiver arrangement 30 in accordance with an embodiment of the present invention. The receiver arrangement 30 may be used within, for example, the second wireless device 14 of FIG. 1 or in other wireless components, devices, or systems. The receiver arrangement 30 is particularly well suited for use in systems practicing open loop MIMO. As illustrated, the receiver arrangement 30 may include one or more of: a radio frequency (RF) receive unit 32, a parallel interference cancellation unit 34, a minimum mean square error (MMSE) filter 36, a decoding subsystem 38, and an encoding subsystem 40. The receiver arrangement 30 processes received signals in an iterative manner. That is, the receiver 30 does not process the received signals in a single pass through a receive chain but, instead, iterates multiple times through the chain to further refine a hard decision output of the receiver.

The RF receive unit 32 receives a signal from a MIMO channel, via multiple antennas, and converts the signal to a baseband representation. As described previously, the MIMO channel will typically have multiple spatial streams. The parallel interference cancellation unit 34 is operative for canceling, for each spatial stream, interference caused by the other spatial streams. As will be described in greater detail, the parallel interference cancellation unit 34 uses hard decision feedback information from the decoding subsystem 38 to perform the cancellation. Because the feedback bits output by the decoding subsystem 38 will often have errors, there will typically be some residual interference within the outputs of the parallel interference cancellation unit 34. The MMSE filter 36 is used to mitigate this residual interference.

The decoding subsystem 38 processes the output of the MMSE filter 36 to generate hard decision bits. The hard decision bits may then be encoded by the encoding subsystem 40 to generate constellation points to be delivered to the parallel interference cancellation unit 34 for use in performing interference cancellation. In the illustrated embodiment, the decoding subsystem 38 includes: a demapper 42, a deinterleaver 44, a depuncturer 46, and a FEC decoder 48. The demapper 42 demaps the received data (for each spatial stream) from signal points to individual bits based on a predetermined modulation scheme (e.g., quadrature phase shift keying (QPSK), 4 quadrature amplitude modulation (QAM), 16 QAM, etc.). The deinterleaver 44 removes any interleaving that was added in the remote transmitter. Likewise, the depuncturer 46 compensates for any puncturing that was added in the remote transmitter. The depuncturer usually inserts zeros as the input to the FEC decoder 48 for the bits punctured by the transmitter. The FEC decoder 48 then determines the hard decision bits that are most likely represented by the data input thereto. Any type of hard decision FEC decoder may be used (e.g., a Viterbi decoder, a turbo decoder, etc.). In each particular implementation, the elements that are used within the decoding subsystem 38 will typically depend upon the type of processing that is to be performed within a corresponding transmitter. Thus, if no puncturing or interleaving is performed during transmission within a particular system, then there is no need for a depuncturer or a deinterleaver within the corresponding decoding subsystem 38, an so on. Many different element combinations may be used to form the decoding subsystem 38 in various embodiments.

As described above, the encoding subsystem 40 is used to encode the hard decision bits output by the decoding subsystem 38 to be fed back to the parallel interference cancellation unit 34 for use in performing parallel interference cancellation in a subsequent processing iteration. In the illustrated embodiment, the encoding subsystem 40 includes: a forward error correction (FEC) encoder 50, a puncturer 52, an interleaver 54, and a mapper 56. The FEC encoder 50 encodes the hard decision bits in accordance with a predetermined forward error correction code. Any forward error correction code may be used including, for example, convolutional codes, Turbo codes, LDPC codes, and concatenated codes such as a serial concatenation of a convolutional code and a Reed-Solomon code, and/or others. The puncturer 52 punctures the FEC encoded data and the interleaver 54 interleaves the data in an appropriate manner. The mapper 56 then maps the resulting data based on the corresponding modulation scheme. The resulting symbols are delivered to the parallel interference cancellation unit 34. In at least one embodiment, the encoding subsystem 40 includes functionality that is dedicated for use in receive processing. In other embodiments, elements within a corresponding transmit chain are used to provide the functions of the encoding subsystem 40 to reduce the amount of circuitry that needs to be provided. Like the decoding subsystem 38, the elements that are used within the encoding subsystem 40 will typically be implementation specific.

The signal received from a MIMO channel may be expressed as follows:

$$r = Hx + n$$

where r is the received signal vector, H is the channel matrix, x is the transmitted signal vector, and n is the channel noise vector. For a MIMO channel having three transmit antennas and three receive antennas, the above expression may be rewritten as:

$$\begin{bmatrix} r_1 \\ r_2 \\ r_3 \end{bmatrix} = \begin{bmatrix} H_{11} & H_{12} & H_{13} \\ H_{21} & H_{22} & H_{23} \\ H_{31} & H_{32} & H_{33} \end{bmatrix} \begin{bmatrix} x_1 \\ x_2 \\ x_3 \end{bmatrix} + \begin{bmatrix} n_1 \\ n_2 \\ n_3 \end{bmatrix}$$

where $r_1$, $r_2$, and $r_3$ are the received signal components at the first, second, and third receive antennas, respectively; $H_{11}$-$H_{33}$ are the channel coefficients; $x_1$, $x_2$, and $x_3$ are the transmitted signal components at the first, second, and third transmit antennas, respectively; and $n_1$, $n_2$, and $n_3$ are the noise components associated with the first, second, and third receive antennas, respectively. In a multicarrier system, such as an orthogonal frequency division multiplexing (OFDM) system, the above equation would apply for each individual subcarrier. In a single carrier system, the above equation would hold for the sole carrier.

As described above, the parallel interference cancellation unit 34 cancels, for each spatial stream, the interference caused by the other spatial streams. This may be expressed as follows:

$$r_i = r - H\hat{x}_i$$

where $r_i$ is the interference cancelled signal vector for the ith spatial stream; r is the received signal; and $H\hat{x}_i$ are the interference estimates from the other streams to the ith stream. The vector $\hat{x}_i$ may be determined as follows:

$$\hat{x}_i = \hat{x} - \hat{x}_i e_i$$

where the elements of $e_i$ are all zero except for the ith element, $\hat{x}_i$ is the feedback symbol for the ith stream, and $\hat{x}$ represents the feedback symbols computed from the hard decision decoded bits. The vector $\hat{x}_i$ is contains the estimated symbols interfering with the ith stream. Other techniques for implementing parallel interference cancellation may alternatively be used.

The ideal MMSE filter for the interference canceled signal vector $r_i$ may be expressed as follows:

$$w_i = \arg\min_w E\{\|wr_i - x_i\|^2\}$$

where $w_i$ is the MMSE filter (vector) for the ith stream, w is the testing filter in the optimization, and $x_i$ is the transmitted symbol in the ith stream. The above expression is of relatively high complexity due to the unknown statistics of the feedback errors. In one aspect of the present invention, it is approximated that the residual interference in $r_i$ has the same statistics as the original data stream, but with a decreased power level. Using this approximation, a simple MMSE filter (a row vector) for the ith data stream may be obtained by solving:

$$w_i = \arg\min_w E\{\|w(HD_i(t)x + n) - x_i\|^2\}$$

to achieve:

$$w_i = (D_i(t)H^H(HD_i^2(t)H^H + \sigma^2 I)^{-1})_{i,:} \quad \text{(Equation 1)}$$

where $D_i^2(t) = \text{diag}[p(t), \ldots, 1 \ldots, p(t)]$ is a diagonal matrix whose diagonal elements all equal $p(t)$ except for the ith element, which equals 1; $D_i(t) = \text{diag}[\sqrt{p(t)}, \ldots, 1 \ldots, \sqrt{p(t)}]$; the numbers of rows and columns of $D_i(t)$ and $D_i^2(t)$ equal the number of data streams; $\sigma^2$ is the noise variance; I is the identity matrix; $^{-1}$ denotes the matrix inversion operation; $^H$ denotes the combination of conjugate and transpose operations; and $(\ )_{i,:}$ denotes taking the ith row of the matrix in parentheses. The parameter $p(t)$ represents the interference power for the ith iteration in the receiver. Because only the ith row of the matrix is needed in the outermost parentheses and the ith diagonal entry of $D_i(t)$ is one, the expression above can be simplified, by dropping one $D_i(t)$, as follows:

$$w_i = (H^H(HD_i^2(t)H^H + \sigma^2 I)^{-1})_{i,:} \quad \text{(Equation 2)}$$

Using matrix identity, and assuming H is not a square matrix (i.e. there are more receive antennas than data streams), the complexity of calculating $w_i$ in Equation 2 above may be further reduced as follows:

$$w_i = ((D_i(t)H^H HD_i(t) + \sigma^2 I)^{-1}D_i(t)H^H)_{i,:}$$

For a 3×2 channel matrix, for example, the expression in Equation 2 requires an inversions of a 3×3 matrix while the above expression only needs the inversion of a 2×2 matrix. As will be appreciated, there are several low complexity ways to compute the MMSE filter of Equation 1 above.

The parameter $p(t)$ in the above expressions will typically change (i.e., become smaller) for each successive iteration. With each successive iteration of the receiver arrangement 30 of FIG. 2, the amount of residual interference gets smaller. Thus, the interference power level is reduced with each iteration. For a particular modulation coding scheme, a sequence of power levels may be selected for use during the successive iterations of the receiver processing within the MMSE filter 36. For example, for 64-QAM modulation with code rate ½, the successive power levels may be taken as:

P(1)=1.00
P(2)=0.25
P(3)=0.09
P(4)=0.01 or an approximation thereof. Other interference power level sequences may be used with other modulation coding schemes. To develop a sequence of power levels for a modulation coding scheme, the following procedure may be followed. Since there is no feedback in the first iteration, the first power level p(1) is taken as 1.00. The subsequent values of p(t) can then be searched using simulations for each code and modulation. For example, in one approach, the optimal value of p(2) may be found by searching values from 0 to 1 and then selecting the value with the best result after two iterations. In another approach, the value of p(2) and p(3) may be jointly optimized by searching vectors (p(2), p(3)) with p(2), p(3)∈ [0,1]. In still another approach, the empirical variance (or power) of the feedback error may be computed using simulations and then used as the p(t). Other techniques may alternatively be used. Although four power levels are shown in the above example, it should be appreciated that a higher or lower number of power levels/iterations may be used in different implementations of the invention.

Referring to FIG. 2, in the first receiver iteration, there is no feedback information. Thus, little or no interference cancellation occurs within the parallel interference cancellation unit 34. This is why the first interference power level in the above sequence is 1 (i.e., the interference power level is assumed to be the same as the signal power level in the MMSE filter). In this case, the expression in Equation 2 above reduces to the normal, non-iterative MMSE filter:

$$w_i = (H^H(HH^H + \sigma^2 I)^{-1})_{i,:} \quad \text{(Equation 3)}.$$

On the second iteration, the feedback from the first iteration is available. The estimates $\hat{x}_1, \hat{x}_2,$ and $\hat{x}_3$ may then be calculated as follows using the interference power level of 0.25 from the predetermined sequence:

$$\hat{x}_1 = \left(H^H\left(H\begin{bmatrix}1 & & \\ & 0.25 & \\ & & 0.25\end{bmatrix}H^H + \sigma^2 I\right)^{-1}\right)_{1,:} r_1$$

$$\hat{x}_2 = \left(H^H\left(H\begin{bmatrix}0.25 & & \\ & 1 & \\ & & 0.25\end{bmatrix}H^H + \sigma^2 I\right)^{-1}\right)_{2,:} r_2$$

$$\hat{x}_3 = \left(H^H\left(H\begin{bmatrix}0.25 & & \\ & 0.25 & \\ & & 1\end{bmatrix}H^H + \sigma^2 I\right)^{-1}\right)_{3,:} r_3$$

where $\hat{x}_1, \hat{x}_2$ and $\hat{x}_3$ are the output of MMSE filters; $r_1, r_2,$ and $r_3$ are the signal vectors where interferences from other data streams are partly removed in parallel; and $H^H$ is the conjugate transpose of matrix H. Similarly, on the third iteration, the estimates of $\hat{x}_1, \hat{x}_2,$ and $\hat{x}_3$ may be calculated as follows using the interference power level of 0.09:

$$\hat{x}_1 = \left(H^H\left(H\begin{bmatrix}1 & & \\ & 0.09 & \\ & & 0.09\end{bmatrix}H^H + \sigma^2 I\right)^{-1}\right)_{1,:} r_1$$

$$\hat{x}_2 = \left(H^H\left(H\begin{bmatrix}0.09 & & \\ & 1 & \\ & & 0.09\end{bmatrix}H^H + \sigma^2 I\right)^{-1}\right)_{2,:} r_2$$

$$\hat{x}_3 = \left(H^H\left(H\begin{bmatrix}0.09 & & \\ & 1 & \\ & & 0.09\end{bmatrix}H^H + \sigma^2 I\right)^{-1}\right)_{3,:} r_3$$

and so on. Again, the specific interference power level values that are used will typically depend on the modulation scheme that is being implemented.

In at least one embodiment, the receiver arrangement 30 of FIG. 2 is modified to operate without FEC coding. That is, the code rate is 1 and there is no mixing of information bits and no redundant bits are added. For the uncoded case, the encoding subsystem 40 of FIG. 2 may be replaced by a symbol quantizer. The symbol quantizer quantizes the spatially decoupled (or MMSE filtered) symbols $w_i r_i$, where $w_i$ and $r_i$ are the row and column vectors, respectively. The quantization is to map the filtered symbol to the closest constellation point, where the signal constellation is used by the transmitter. The quantized symbols are then fed back for parallel cancellation. The iteration in FIG. 2 is to find the maximum likelihood estimation of the transmitted signal vector x as follows:

$$\hat{x} = \arg\min_{\tilde{x}} \|H\tilde{x} - r\|^2$$

where r is the received signal vector; $\tilde{x}$ is the testing vector for transmitted symbols that are in the constellation; $\hat{x}$ is the maximum likelihood estimate of the transmitted vector x; and $\|\ \|$ denotes the vector norm.

Figure 3:
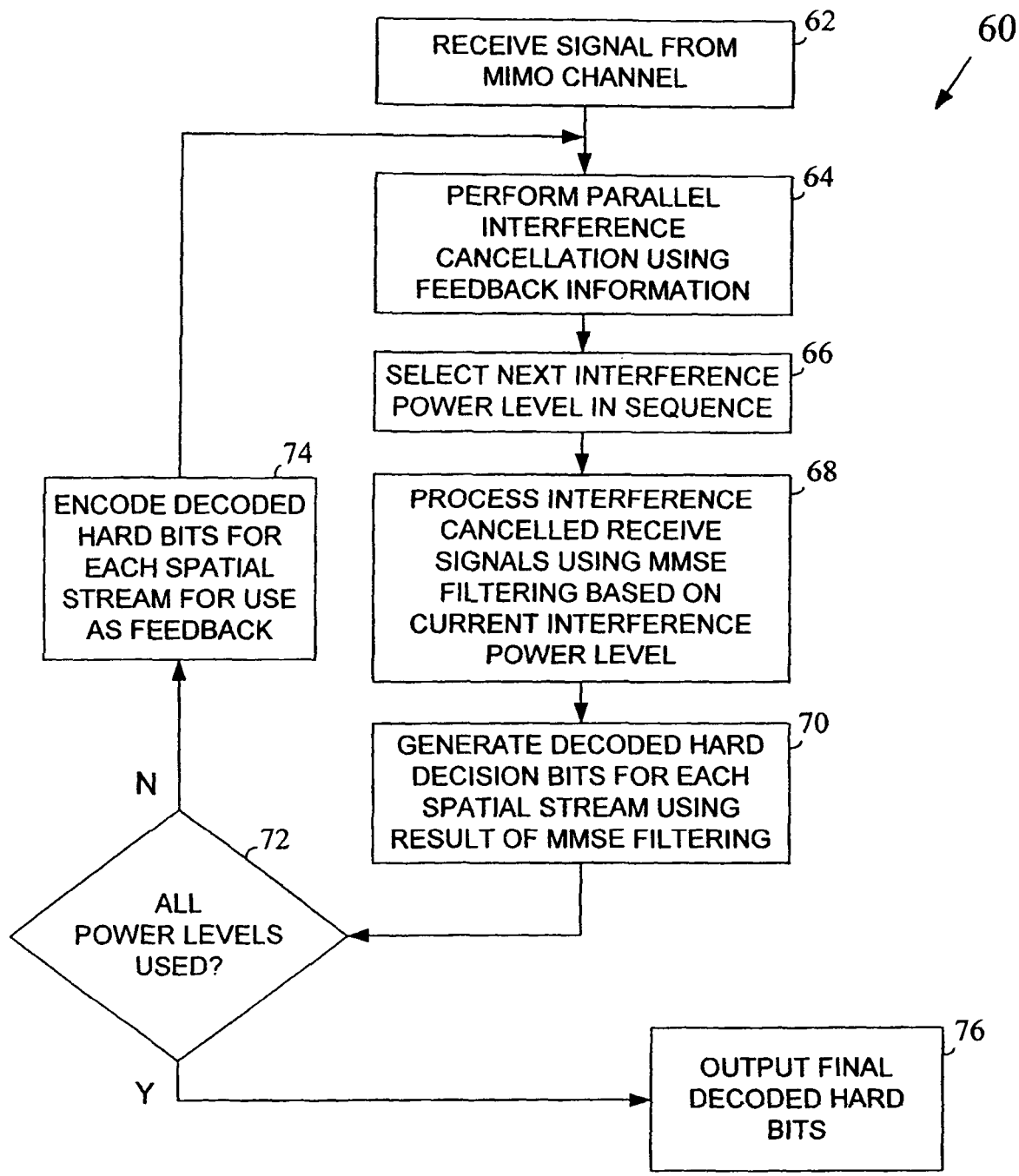
FIG. 3 is a flowchart illustrating an example method for decoding receive signals in an open loop MIMO system in accordance with an embodiment of the present invention.

FIG. 3 is a flowchart illustrating an example iterative method 60 for processing receive signals in an open loop MIMO based system in accordance with an embodiment of the present invention. First, a signal is received from a MIMO channel via multiple receive antennas (block 62). The MIMO channel includes multiple spatial streams. Parallel interference cancellation is then performed for each spatial stream to remove interference caused by other spatial streams, using hard decision feedback information (block 64). On the first iteration, there is no hard decision feedback information and, therefore, little or no interference cancellation is achieved. On subsequent iterations, feedback information will be available and interference cancellation will be achieved. However, some residual interference will typically exist after the interference cancellation has been performed. To remove the residual interference, MMSE filtering is used.

A sequence of decreasing interference power levels may be established before the method 60 is initiated for use in performing MMSE filtering. The values in the sequence may depend upon the specific modulation coding scheme being used. During each iteration of the method 60, the next interference power level in the sequence is selected for use (block 66). As described previously, in at least embodiment, the interference power level sequence is [1, 0.25, 0.09, 0.01]. After interference cancellation, the signals are processed using MMSE filtering based on the currently selected interference power level (block 68). As described above, during the first iteration a power level of 1 may be used, resulting in the traditional MMSE filter (e.g., see Equation 3 above). On each successive iteration, a lower interference power level is used. After MMSE filtering, decoded hard decision bits are generated for each spatial stream using the result of the MMSE filtering (block 70). This may involve performing, for example, one or more of demapping, deinterleaving, and/or depuncturing before applying a corresponding signal to a Viterbi decoder (or other form of hard decision FEC decoder).

It may next be determined whether all of the interference power levels in the sequence have yet been used or a fixed number of iterations has been reached (block 72). If not, the decoded hard decision bits are encoded for each spatial stream to reproduce an approximation of the transmitted signal for use as feedback in the next iteration (block 74). In at least one embodiment, the hard decision bits are first encoded using a predetermined forward error correction (FEC) code. The FEC encoded bits may then be processed by one or more of puncturing, interleaving, and/or mapping. In at least one implementation, the encoding of the feedback information is performed within a transmit chain of the associated device. In other implementations, dedicated encoding functionality may be provided. At this point, the method 60 may return to block 64 where parallel interference cancellation is again performed using the feedback information. The process then repeats. Eventually, all of the interference power levels in the sequence will have been used (or all of the fixed number of iterations will have been performed) (block 72-Y). At this point, the final decoded hard decision bits may be output as the received data (block 76).

In the method 60 described above, MMSE filtering is used as a spatial demultiplexer in all of the processing iterations. However, because there is no cancellation in the first iteration, and a power level of 1 is used for the interference, in at least one embodiment, a different form of spatial demultiplexing may be used in the first iteration (e.g., zero forcing filter, maximum likelihood, etc.). If a better form of spatial demultiplexing is used in the first iteration, then the residual interference in the second iteration may be smaller than it would be if MMSE was used. Therefore, if this technique is implemented, the power levels in the sequence (after the first power level) may need to be decreased accordingly. Each subsequent iteration of the modified method 60 would then use MMSE filtering as described above.

The techniques and structures of the present invention may be used in both single carrier and multicarrier communication systems. In at least one embodiment, for example, features of the invention are implemented in a system that uses a form of multicarrier communication known as orthogonal frequency division multiplexing (OFDM). In a multicarrier system, the processing described above will typically be performed for each subcarrier of the system (although interpolation between subcarriers may be used to reduce processing overhead). The techniques and structures of the present invention have been described above in the context of a wireless communication system. It should be appreciated that the invention also has application in wired systems. For example, the techniques may be used to help mitigate crosstalk between wires in a digital subscriber line (DSL) based system. Other wired applications also exist. In at least one embodiment, features of the invention are incorporated into a smart interface card (SIC).

In the description above, some language is used that is typically associated with the IEEE 802.11 wireless networking standard. It should be appreciated, however, that the techniques and structures of the present invention are not limited to application in systems following IEEE 802.11 and its progeny. On the contrary, the techniques and structures may be used in connection with a wide variety of different wireless and wired standards and protocols.

The techniques and structures of the present invention may be implemented in any of a variety of different forms. For example, features of the invention may be embodied within laptop, palmtop, desktop, and tablet computers having wireless networking capability; personal digital assistants (PDAs) having wireless networking capability; wireless access points and/or base stations; other wireless network devices; cellular telephones and other handheld wireless communicators; pagers; satellite communicators; cameras having wireless capability; audio/video devices having wireless capability; network interface cards (NICs) and other network interface structures; integrated circuits; as instructions and/or data structures stored on machine readable media; and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

It should be appreciated that the individual blocks illustrated in the block diagrams herein may be functional in nature and do not necessarily correspond to discrete hardware elements. For example, in at least one embodiment, two or more of the blocks are implemented in software within a single digital processing device. The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others. Combinations of multiple digital processing devices may also be utilized. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A machine implemented method comprising:
   receiving a signal from a multiple input, multiple output (MIMO) channel, said MIMO channel having multiple spatial streams;
   performing parallel interference cancellation on the received signal for each of said multiple spatial streams to generate interference cancelled signals;
   minimum mean square error (MMSE) filtering said interference cancelled signals while assuming a first predetermined interference power level to generate MMSE filtered signals;
   generating hard decision bits for said multiple spatial streams using said MMSE filtered signals; and
   repeating performing parallel interference cancellation, MMSE filtering, and generating hard decision bits for at least one additional iteration, wherein MMSE filtering for each additional iteration assumes an interference power level that is less than that used in a previous iteration, wherein said interference power levels used during successive iterations are part of a predetermined interference power level sequence that is selected for a corresponding modulation coding scheme.

2. The method of claim 1, wherein:
   performing parallel interference cancellation includes using hard decision feedback information, when available.

3. The method of claim 1, further comprising:
   encoding hard decision bits generated during one iteration for use in performing parallel interference cancellation in a subsequent iteration.

4. The method of claim 3, wherein:
   encoding hard decision bits includes performing at least one of: FEC encoding, puncturing, interleaving, and mapping.

5. The method of claim 1, wherein:
   said predetermined interference power level sequence is approximately [1.00, 0.25, 0.09, 0.01].

6. The method of claim 1, wherein:
   MMSE filtering said interference cancelled signals includes using the filter response:

$$w_i = H^H(HD_i^2(t)H^H + \sigma^2 I)^{-1})_{i,:}$$

where $D_i^2(t) = \text{diag}[p(t), \ldots, 1 \ldots, p(t)]$ is a diagonal matrix whose diagonal elements all equal $p(t)$ except for the ith element, which equals 1; $p(t)$ represents the interference power for the tth iteration in the receiver; $\sigma^2$ is the noise variance; I is the identity matrix; $^{-1}$ denotes the matrix inversion operation; $^H$ denotes the combination of conjugate and transpose operations; and $()_{i,:}$ denotes taking the ith row of the matrix in parentheses.

7. The method of claim 1, wherein:
   generating hard decision bits includes performing at least one of: demapping, deinterleaving, depuncturing, and Viterbi decoding.

8. The method of claim 1, wherein:
   receiving a signal includes receiving a multicarrier signal having a plurality of subcarriers; and
   performing parallel interference cancellation, MMSE filtering said interference cancelled signals, generating hard decision bits, and repeating are performed for individual subcarriers of said plurality of subcarriers.

9. The method of claim 1, wherein:
   said predetermined interference power level sequence is approximately [1.00, 0.25, 0.09, 0.01] and said corresponding modulation coding scheme is 64-QAM modulation with code rate ½.

10. An apparatus comprising:
    a radio frequency (RF) receive unit to receive a signal from a MIMO channel having multiple spatial streams;
    a parallel interference cancellation unit to cancel, for individual spatial streams, interference within said received signal caused by other spatial streams;
    a minimum mean square error (MMSE) filter to mitigate, for individual spatial streams, residual interference within outputs of said parallel interference cancellation unit;
    a decoding subsystem to generate hard decision bits, for individual spatial streams, using outputs of said MMSE filter; and
    an encoding subsystem to encode said hard decision bits, for individual spatial streams, to be fed back to said parallel interference cancellation unit for use in parallel interference cancellation;
    wherein said apparatus processes a received signal in a number of iterations, wherein said MMSE filter assumes, for each successive iteration, a decreasing interference power level that is chosen in accordance with a predetermined interference power level sequence associated with a modulation coding scheme used to generate said signal received from said MIMO channel.

11. The apparatus of claim 10, wherein:
    said predetermined interference power level sequence is approximately [1.00, 0.25, 0.09, 0.01].

12. The apparatus of claim 10, wherein said decoding subsystem includes a demapper to demap received signal points to individual bits based on a predetermined modulation scheme.

13. The apparatus of claim 10, wherein said decoding subsystem includes a deinterleaver to deinterleave received bits.

14. The apparatus of claim 10, wherein said decoding subsystem includes a depuncturer to remove puncturing from received data.

15. The apparatus of claim 10, wherein said decoding subsystem includes a Viterbi decoder.

16. The apparatus of claim 10, wherein:
said encoding subsystem includes at least one of: a FEC encoder, a puncturer, an interleaver, and a constellation mapper.

17. The apparatus of claim 10, wherein:
said MMSE filter has a filter response:

$$w_i = H^H (HD_i^2(t)H^H + \sigma^2 I)^{-1})_{i,:}$$

where $D_i^2(t) = \text{diag}[p(t), \ldots 1, \ldots, p(t)]$ is a diagonal matrix whose diagonal elements all equal $p(t)$ except for the ith element, which equals 1; $p(t)$ represents the interference power for the tth iteration in the receiver; $\sigma2$ is the noise variance; I is the identity matrix; $^{-1}$ denotes the matrix inversion operation; $^H$ denotes the combination of conjugate and transpose operations; and $(\ )_{i,:}$ denotes taking the ith row of the matrix in parentheses.

18. The apparatus of claim 10, wherein:
said predetermined interference power level sequence is approximately [1.00, 0.25, 0.09, 0.01] and said modulation coding scheme is 64-QAM modulation with code rate ½.

19. A system comprising:
multiple dipole antennas;
a radio frequency (RF) receive unit, coupled to said multiple dipole antennas, to receive a signal from a MIMO channel having multiple spatial streams;
a parallel interference cancellation unit to cancel, for individual spatial streams, interference within said received signal caused by other spatial streams;
a minimum mean square error (MMSE) filter to mitigate, for individual spatial streams, residual interference within outputs of said parallel interference cancellation unit;
a decoding subsystem to generate hard decision bits, for individual spatial streams, using outputs of said MMSE filter; and
an encoding subsystem to encode said hard decision bits, for individual spatial streams, to be fed back to said parallel interference cancellation unit for use in parallel interference cancellation;
wherein said apparatus processes a received signal in a number of iterations, wherein said MMSE filter assumes, for each successive iteration, a decreasing interference power level that is chosen in accordance with a predetermined interference power level sequence associated with a modulation coding scheme used to generate said signal received from said MIMO channel.

20. The system of claim 19, wherein:
said predetermined interference power level sequence is approximately [1.00, 0.25, 0.09, 0.01].

21. The system of claim 19, wherein:
said MMSE filter has a filter response:

$$w_i = H^H (HD_i^2(t)H^H + \sigma^2 I)^{-1})_{i,:}$$

where $D_i^2(t) = \text{diag}[p(t), \ldots, 1 \ldots, p(t)]$ is a diagonal matrix whose diagonal elements all equal $p(t)$ except for the ith element, which equals 1; $p(t)$ represents the interference power for the tth iteration in the receiver; $\sigma^2$ is the noise variance; I is the identity matrix; $^{-1}$ denotes the matrix inversion operation; $^H$ denotes the combination of conjugate and transpose operations; and $(\ )_{i,:}$ denotes taking the ith row of the matrix in parentheses.

22. The system of claim 19, wherein:
said predetermined interference power level sequence is approximately [1.00, 0.25, 0.09, 0.01] and said modulation coding scheme is 64-QAM modulation with code rate ½.

23. An article comprising a computer readable storage medium having instructions stored thereon that, when executed by a computing platform, operate to:
receive a signal from a multiple input, multiple output (MIMO) channel, said MIMO channel having multiple spatial streams;
perform parallel interference cancellation on the received signal for each of said multiple spatial streams to generate interference cancelled signals;
minimum mean square error (MMSE) filter said interference cancelled signals while assuming a first predetermined interference power level to generate MMSE filtered signals;
generate hard decision bits for said multiple spatial streams using said MMSE filtered signals; and
repeat operation to perform parallel interference cancellation, operation to MMSE filter, and operation to generate hard decision bits for at least one additional iteration, wherein said operation to MMSE filter for each additional iteration assumes an interference power level that is less than that used in a previous iteration, wherein said interference power levels used during successive iterations are part of a predetermined interference power level sequence that is selected for a corresponding modulation coding scheme.

24. The article of claim 23, wherein:
operation to perform parallel interference cancellation includes using hard decision feedback information, when available.

25. The article of claim 23, wherein said instructions further operate to:
encode hard decision bits generated during one iteration for use to perform parallel interference cancellation in a subsequent iteration.

26. The article of claim 25, wherein:
operation to encode hard decision bits includes operation to perform at least one of: FEC encoding, puncturing, interleaving, and constellation mapping.

27. The article of claim 23, wherein:
operation to generate hard decision bits includes operation to perform at least one of: demapping, deinterleaving, depuncturing, and Viterbi decoding.

28. The article of claim 23, wherein:
said predetermined interference power level sequence is approximately [1.00, 0.25, 0.09, 0.01].

29. The article of claim 23, wherein:
said predetermined interference power level sequence is approximately [1.00, 0.25, 0.09, 0.01] and said corresponding modulation coding scheme is 64-QAM modulation with code rate ½.

* * * * *